Feb. 21, 1950 C. O. SCHRADER ET AL 2,498,009
METHOD OF AND APPARATUS FOR ASSEMBLING
BALL POINTED WRITING INSTRUMENTS
Filed June 27, 1947 2 Sheets-Sheet 2
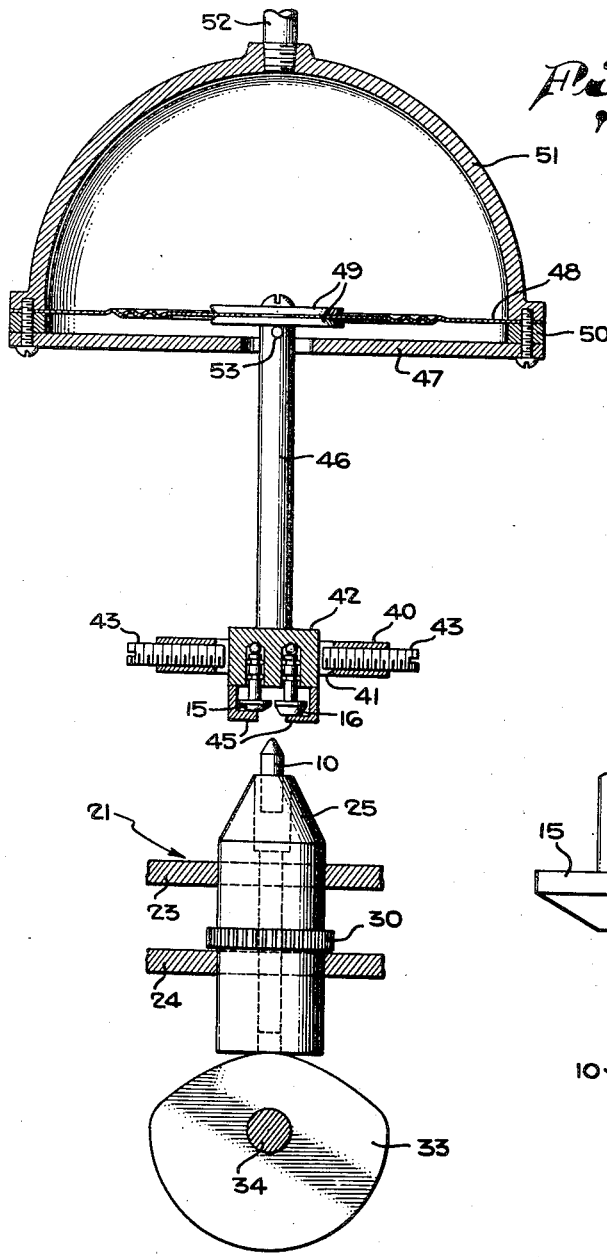
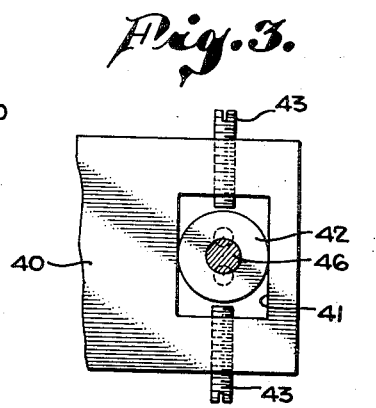
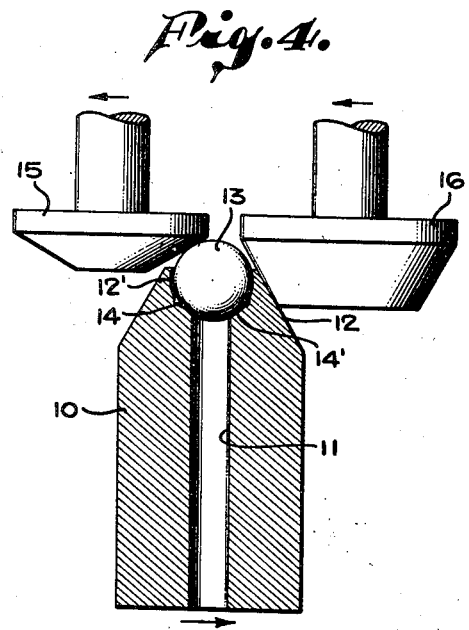
INVENTORS
CLARENCE O. SCHRADER
HARTLEY M. SEARS
BY
ATTORNEY Patented Feb. 21, 1950

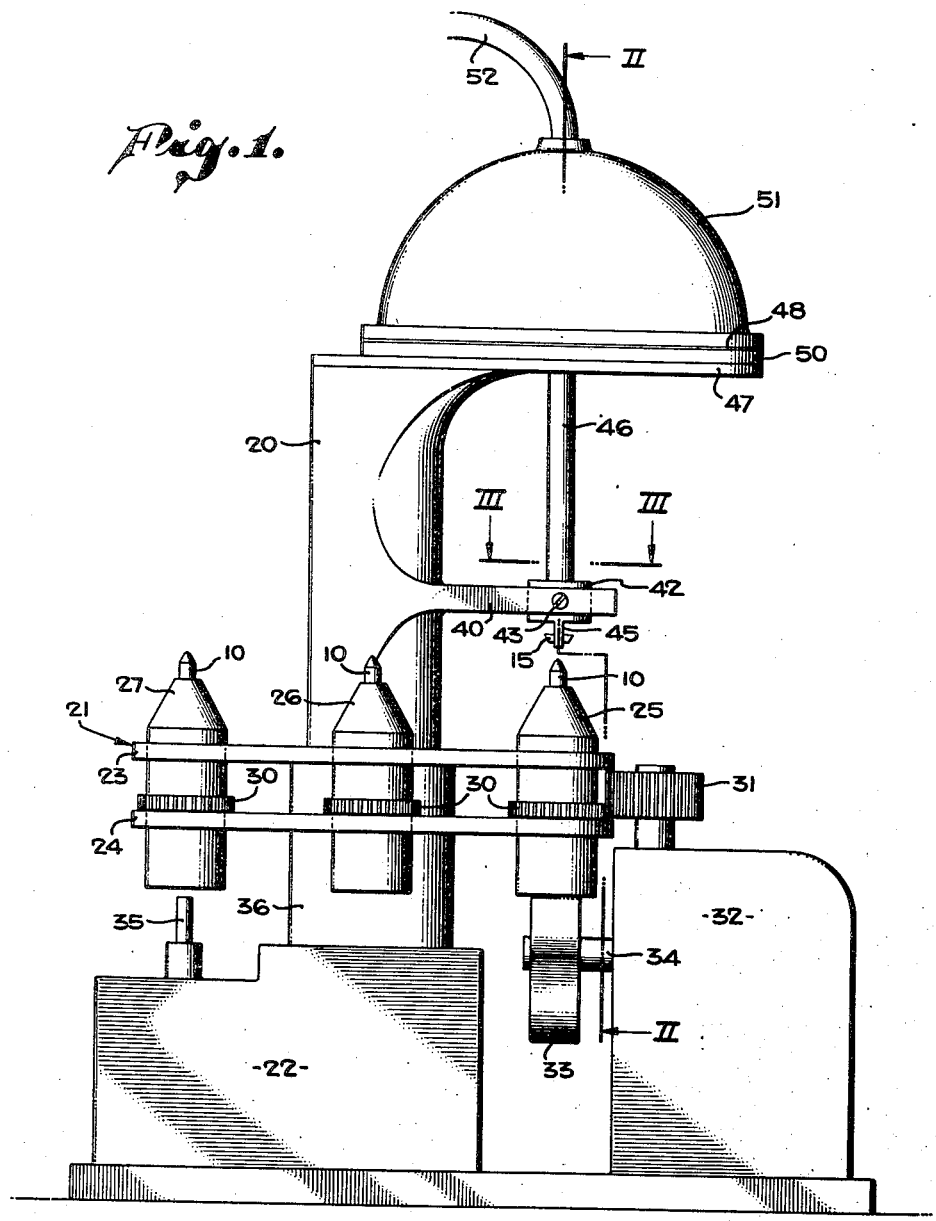

2,498,009

UNITED STATES PATENT OFFICE 2,498,009

METHOD OF AND APPARATUS FOR ASSEMBLING BALL-POINTED WRITING INSTRUMENTS

Clarence O. Schrader, Burbank, and Hartley M. Sears, Pasadena, Calif., assignors to Hartley Pen Company, Pasadena, Calif., a corporation of California Application June 27, 1947, Serial No. 757,374

10 Claims. (Cl. 113—32)

This invention pertains to means and methods of assembling ball-pointed writing instruments and is particularly directed toward methods and means for swedging the ball into a cavity so as to retain the ball therein in a freely rotatable condition, sufficient clearance being left between the metal of the point or ball holder and the ball so as to permit writing fluid to readily and easily pass between the ball and such point.

Ball-pointed writing instruments write by reason of a freely rotatable ball held in a point assembly. The ball is generally held by crimping edge areas of metal around the ball so as to extend beyond a transverse plane passing through the center of the ball. A writing fluid of suitable viscosity is contained within the pen or reservoir in communication with the surface of the ball within the cavity. As the ball rotates during writing, a film of ink clinging to the ball is brought to the surface and transferred or laid upon the paper or other material upon which the instrument is being used.

It is evident that the balls employed must be extremely small in order to permit the production of a fine line.

It is also evident that the ball must be freely rotatable, since if it does not rotate, it cannot make the writing fluid available for writing purposes. It has been determined that the clearance between the ball and its socket must be uniform and correlated to some extent to the viscosity of the writing fluid. Such clearance or tolerance cannot be excessive, since then the ink will ooze out of the writing point whether the ball is rotated or not. In effect, the clearance or tolerance between the writing ball and its socket must be of a capillary type, permitting the ink to exist between the ball and the socket and to be withdrawn therefrom by the rotation of the ball but not sufficiently large so as to permit ready flow of writing fluid under the influence of changes in atmospheric pressure, temperature or the mass inertia effects of shaking or jerking the writing instrument.

Prior writing instruments employing the ball have not been satisfactory, and it has been discovered that the difficulties encountered in making pocket pens using the ball point principle are due to the difficulties encountered in properly swedging the metal around the ball. Heretofore, points made of hard metals having high elastic recovery were used or very fluid inks employed in order to create sufficient clearance between the metal of the point and the ball, and since the metal was crimped by means of dies, it was not possible to obtain a very smooth seat for the ball. This invention is directed toward means and methods whereby the swedging operation may be carried out in a controllable manner, whereby a uniform flow of metal is attained to positively hold the ball within its socket or cavity without impairing the free rotatability of the ball or pinching the ball and thereby preventing the proper supply of ink to the ball during writing. In accordance with the present invention, softer, free-machining metals, such as brass, aluminum, soft stainless steel, etc., can be used and the ball pressed into the cavity so as to form a bottom seat portion.

Generally stated, the method of the present invention contemplates holding the ball within its socket and against its seat and applying swedging pressure to the outer surface of the nose of the assembly, preferably at a point opposed to the point at which pressure is applied to the ball, establishing relative rotation between the point assembly and the two swedges and thereby rolling the metal of the point assembly around the ball while permitting the opposing side of the nose metal to operate away from the ball, all these operations taking place under a controlled swedging pressure so that at their completion, the ball is firmly held within the assembly, and adequate clearance exists between the ball and the point holder to allow writing fluid to be held therein by capillary action.

It is an object of the present invention, therefore, to disclose and provide means and methods for swedging the metal of point assemblies around the writing ball.

A further object of the invention is to disclose and provide an improved method of swedging the metal of the nose of a writing point around a ball to permit its ready rotation.

A still further object of the invention is to disclose and provide a method of assembling writing points without the use of dies.

These and other objects and advantages of the present invention will become apparent to those skilled in the art from the following detailed description of certain illustrative forms of devices in which the method may be carried out. For purposes of illustration, reference will be had to the appended drawings in which Fig. 1 is a side elevation, partly diagrammatic, of one form of apparatus in which the method may be carried out.

Fig. 2 is a front elevation, certain elements being removed in order to facilitate understanding.

Fig. 3 is a plan view or horizontal section taken along the plane III—III in Fig. 1.

Fig. 4 is an enlarged view of the swedges and their relationship to the ball point during the swedging operation.

By referring to Fig. 4, which illustrates a usual type of writing point assembly, it will be noted that such assembly includes a point member 10 provided with an axial channel or passageway 11 and a tapered nose having the inclined surfaces 12. A cavity is formed in the end of such nose, the cavity being adapted to receive a ball 13. Ordinarily, the ball is of larger diameter than the channel 11, so as to form a seat 14, which restrains inward movement of the ball. The metal of the nose must be crimped or drawn inwardly at a zone slightly above and preferably also slightly below a transverse plane passing through the center of the ball 13 in order to retain the ball within the cavity and produce a relatively large spherical zone bearing surface. Since the conduit 11 leads to a reservoir or supply of writing fluid, sufficient clearance must exist between the inner walls of the cavity and seat, and the outer surfaces of the ball, to permit such writing fluid or ink to be carried by the ball to its outer, exposed surface upon rotation of the ball. The holder or point member 10 is in actual practice inserted, pressed, cemented, screwed or otherwise attached to the body of the writing instrument or to a tubular reservoir.

Heretofore, the crimping of the metal of the nose piece around the ball has been accomplished by means of essentially conical dies, but as previously stated, such mode of operation has not been satisfactory. In accordance with the present method, swedges provided with curved surfaces are used in contact with different portions of the point. In Fig. 4, one of such swedges is illustrated at 15 and the other at 16. These two swedges are brought into pressure contact with the point assembly simultaneously, and relative motion is produced between the swedges and the point assembly. One of the swedges 15 is caused to bear against the upper surface of the ball 13 so as to press it against the seat in the area generally indicated at 14'. This swedge is in the form of a small disc provided with a conical face having a base angle of approximately 40°. The other swedge 16 is also in the form of the frustum of a cone, but its inclined surfaces are at a base angle substantially equal to the inclination of the outer surface 12 of the point member. The base angle of the swedge 16 may be slightly less than the base angle of the conical nose surface 12 so as to contact such nose at its extremity and in the region of a transverse plane passing through the ball 13.

It will be noted that when these swedges are brought into operative relation with the point assembly, as illustrated in Fig. 4, the ball is retained and held against a portion of its seat by swedge 15 while the swedge 16 applies an opposing force against the metal of the nose piece. Means, described hereafter in more detail, are provided for bringing the point assembly and the swedges together with a controllable pressure. The metal of the nose piece is thus caused to flow around the ball 13 and past the zone of its maximum width. The opposing side of the nose springs away from the ball, as best shown at 12'. A rolling pressure is thus applied to the metal of the assembly around the ball, permitting the metal to flow more readily and conform to the ball surface which is pressed thereagainst by the opposing swedge 15. By controlling the pressure and the relative rotation, it is possible to produce any desired clearance between the ball and its socket or seat and duplicate these results in commercial production with substantially no losses.

One form of device employing this method of operation is shown in Figs. 1, 2 and 3. In these simplified and partly diagrammatic drawings, the machine comprises a base provided with a stationary standard 20. A work table 21 is rotatably mounted on the standard, and suitable indexing means within the base housing 22 cause the work table to intermittently and partially rotate around the standard so as to position the work beneath the swedging rollers. The work table may consist of upper and lower circular plates 23 and 24 carrying circumferentially movable, rotatable spindles, such as 25, 26, 27, etc., each of these spindles shown provided with a spur gear 30 capable of engagement with the spur gear 31 driven by suitable motor means in the base housing 32. Each of the spindles 25—27 preferably carries a collet in its upper end, such collet being capable of receiving the tubular ball point assembly member 10. A lift cam 33, periodically and intermittently driven by shaft 34 and motor means within the base housing 32, is arranged for operation with the base or bottom of the spindle 25 when it is in position beneath the swedging rollers for the purpose of lifting the entire spindle into working engagement of the assembly with the swedging rollers. It will be noted that the gear 30 is relatively narrow and, therefore, driving contact is established with the gear 31 whether the spindle is in raised or lowered position. It will be evident to those skilled in the art that the various spindles engage the driving gear 31 whenever the turret 21 brings the spindles into position beneath the swedges. The various spindles may be loaded and unloaded at various points in the travel of the table 21. Beneath the loading and unloading positions of the spindles, a vertically reciprocating collet release pin 35 may be positioned, such release pin cooperating with a centrally located aperture in the base of each spindle to release the collet and facilitate the placement of untreated ball point assemblies and the removal of finished assemblies.

The work table 21 may be carried by sleeve 36 surrounding the standard 20 and be driven by indexing means of any desired type. Such means are not show since they are well known in the art and readily adapted.

Above the working position of the spindles, the standard 20 carries a fixed arm 40 provided with a lateral slot 41, in which a swedging head 42 is slidably mounted, limits of lateral movement being established by limit stops 43 carried by the arm. The swedging head carries the swedging rollers 15 and 16. These swedging rollers are preferably mounted on shafts having ball races ground into them and surrounded with bearings to absorb radial load. The upper ends of these shafts may rest against steel balls to absorb thrust load. These swedging rollers, as well as their shafts, are prevented from dropping out of the head 42 by retaining fingers 45.

The swedging head is carried by the lower end of a rod 46, extending through an aperture in a plate 47 carried by the top of the standard 20. The upper end of rod 46 is attached to center of a flexible diaphragm 48 by means of washers and nuts 49. The flexible diaphragm 48 is peripherally held between a spacing ring 50 and the lip of a chamber 51 supplied with air at a predetermined, controllable pressure by means of conduit 52. In its normal position, the downward movement of the rod 46 is prevented by means of a stop pin 53, such pin engaging the upper surface of the plate 47.

It will be evident that the pressure within the chamber 51 establishes accurately the resistance to upward movement of the rod 46 and swedging head 42.

It will be noted that in this form of apparatus, means have been provided (work table 21 and spindles 25—27) for bringing the points 10 into position beneath the swedging rollers 15 and 16. Means have also been provided for pressing the swedging elements against the nose of the point, such means including the lifting cam for lifting the spindle and point against the swedging rollers and the controllable pressure head 51 regulating the pressure with which the rollers are pressed against the desired areas of the point 10. Means have also been provided to permit limited movement of the swedging head 42 transversely of the axis of the point 10 during rotation of the spindle with respect to the swedging rollers, such means including the slot 41 in the arm 40. These means permit the swedging rollers to align themselves perfectly with the ball and the nose of the point 10 and to follow any slight eccentricity present in the point or the spindle which holds the point. It will be noted that any slight misalignment in the direction normal to the axes of the adjustment screws 43 is of no consequence, as the point can move back and forth across the center line between the swedging rollers without changing the swedging action materially. Means have also been provided for producing relative rotation between the swedging rollers and the point; such means in the instant case include gears 30, 31 and the drive to such gear 31.

It may be noted that the lifting cam 33 may be constantly driven at a speed correlated to the speed of the driving gear 31 so that a predetermined number of rotations of the spindle in contact with the swedging rollers is attained during each operation.

It may be noted that the head 42 and rod 46 are made as light as possible, consistent with durability to minimize effects of inertia in operation. The spindles at working position may be driven at speeds of between 600 and 800 R. P. M., suitable bushings being provided in the upper and lower portions of the work table 21. At such rotational speed and at an approximate working pressure of between 20 and 30 pounds, the point assembly is subjected to the swedging action for approximately six to ten revolutions of the spindle with satisfactory results.

Although in the illustrated embodiment the spindles only rotate while in swedging position, the device may be arranged to drive the spindles constantly, that is, while they are being loaded, unloaded, and while swedging. This could be readily attained by providing a centrally driven gear surrounding the central standard 20, such gear being in constant engagement with the planetary arrangement of spindles and their gears. Various other ways of rotating the spindles may be provided, such as friction drives or belts. Moreover, the invention contemplates the use of stationary or non-rotatable spindles and a rotatable swedging head. Such swedging head could be readily rotated by means of a belt drive. The swedging elements may either be frusto-conical or provided with curved surfaces and may either be rotatable or fixed; the axis of rotation, if rotatable swedges are used, may be parallel to the axis of rotation of the point assembly as illustrated in Fig. 4, or they may be inclined or transverse to such axis. Moreover, the invention is not limited to the specific machine illustrated, since the method of operation may be carried out with but a single spindle. Instead of a pair of swedges, three or more may be used, but because of the minute size of the ball in modern pens (0.040" in diameter), is is impractical to use more than two or three swedges. Although in the illustrative embodiment means have been provided for moving the spindle toward and away from the swedging head, this invention contemplates a reversal in that the swedging head itself may be positively moved toward and away from the spindle.

In all of these modified forms, as well as in the illustrated form, the ball is pressed against a portion of the seat contiguous to that portion of the nose against which the upwardly directed pressure is applied, and the metal of the nose is deformed to the curvature of the ball to retain the same within the cavity. The swedging roller 16 applies an inwardly directed, circumferentially applied rolling pressure against the outer surface of the nose, while the swedging roller 15 applies a rolling pressure to the ball at a point above and opposed to the force exerted by swedging roller 16.

It may be noted that the method of the present invention may be used as a finishing operation after preliminary die pressing of the ball into the cavity and the deformation of the metal of the nose into crimped position around the ball. When these preliminary operations are used, the method of this invention then actually stretches the metal, having a thinning action thereon, and is employed primarily for the purpose of enhancing the smoothness of the seat and internal surfaces of the cavity and the establishment of a desired clearance between the ball and the metal of the point. Moreover, softer metals than those used heretofore can be employed. However, the entire operation of drawing the metal of the nose around the ball and simultaneously attaining a desired clearance can be accomplished by the performance of the method, even though the preliminary die-forming operations are dispensed with.

All changes and modifications coming within the appended claims are embraced thereby.

We claim:

1. In a machine for assembling ball-pointed writing instruments, wherein a ball is to be rotatably held in a cavity formed in the tapered nose of a ball point member, the combination of: a pair of swedging elements, each provided with a face inclined to the axis of the ball cavity in the ball point member, the face of one swedging element being arranged to contact the surface of the ball on one side of the axis of the cavity and the face of the other swedging element being arranged to contact the outer surface of the nose on the opposite side of the axis of the cavity in the region of the transverse plane passing through the center of the ball in the cavity and means for imparting relative rotation to the swedging elements and ball point member while they are in pressure contact.

2. In a machine of the character stated in claim 1, wherein each of the swedging elements comprises a frusto-conical member rotatable about an axis parallel to the axis of the ball cavity.

3. In a machine of the character stated in claim 1, the provision of means arranged to permit limited movement of the swedges jointly transversely of the axis of the ball point member during relative rotation between the swedges and member.

4. In a method of producing a desired clearance between a ball and the inner walls of a cavity in the nose of a member in which said ball is held, the steps of: applying pressure to the ball at a point above the nose and to one side of the axis of the cavity; applying pressure to the nose externally of the cavity in a direction virtually opposed to the first-mentioned pressure; and rapidly moving the pressure point last mentioned around the axis of the ball to thin the metal of the nose and cause it to spring away from the ball surface.

5. In a method of producing a desired clearance between a ball and the inner walls of a cavity in the nose of a member in which said ball is held, the steps of: applying a pre-determined rolling pressure to the ball at a series of points above the nose and around the axis of the cavity; and applying pre-determined rolling pressure to the nose externally of the cavity and virtually opposed to the first-mentioned pressure.

6. In a method of finishing a ball seat in a writing point assembly, the steps of: applying an inwardly directed, circumferentially applied, rolling pressure against the outer surface of the nose of the writing assembly in the region of a transverse plane passing through the center of the ball and simultaneously applying a rolling pressure to the ball at a point above and virtually opposed to the first-mentioned rolling pressure; and controlling the pressure applied and the number of circumferential applications of pressure, whereby the inner surface of the ball cavity is smoothed and a desired clearance attained between the ball and the inner surfaces of such cavity.

7. In a machine for assembling ball-pointed writing instruments wherein a ball is to be rotatably held in a cavity formed in the tapered nose of a ball point member, said cavity including a seat for the ball, the combination of: a pair of swaging elements, each provided with a face inclined to the axis of a ball cavity in the ball point member, the working faces of said swaging elements being in spaced transverse planes with respect to the axis of the ball cavity and at different distances from such axis, the face of one swaging element being arranged to contact the surface of the ball on one side of the axis of the cavity to hold the ball in the cavity and against the seat, and the face of the other swaging element being arranged to simultaneously contact the outer surface of the nose on the opposite side of the axis of the cavity in the region of the transverse plane passing through the center of the ball in the cavity, and means for imparting relative rotation to the swaging elements and ball point member while they are in pressure contact.

8. A machine of the character stated in claim 7, wherein each of the swaging elements comprises a frusto-conical member rotatable about an axis parallel to the axis of the ball cavity.

9. In a machine of the character stated in claim 7, the provision of means arranged to permit limited movement of the swaging elements jointly transversely of the axis of the ball point member during relative rotation between the swaging elements and member.

10. A machine of the character stated in claim 7, wherein each of the swaging elements comprises a frusto-conical member rotatable about an axis parallel to the axis of the ball cavity, means for moving the ball point member into operative relation with said swaging elements, means for controllably moving the ball point member and swaging elements toward and away from each other and means for pressing the swaging elements against the nose and ball with a controllably regulatable pressure.

CLARENCE O. SCHRADER.
HARTLEY M. SEARS.

REFERENCES CITED

The following references are of record in the file of this patent:

UNITED STATES PATENTS

| Number | Name | Date |
|---|---|---|
| 1,842,571 | Sebell | Jan. 26, 1932 |
| 1,884,155 | Ostnaes | Oct. 25, 1932 |
| 1,946,211 | Hiester | Feb. 6, 1934 |
| 2,030,818 | Harter | Feb. 11, 1936 |
| 2,223,324 | Kosatka | Nov. 26, 1940 |
| 2,258,841 | Biro | Oct. 14, 1941 |

FOREIGN PATENTS

| Number | Country | Date |
|---|---|---|
| 683,560 | Germany | of 1939 |